United States Patent [19]

Hsu et al.

[11] Patent Number: 5,140,642
[45] Date of Patent: Aug. 18, 1992

[54] METHOD AND DEVICE FOR ALLOCATING CORE POINTS OF FINGER PRINTS

[75] Inventors: Wen H. Hsu, 3F, No. 66, West Yuan, Tsing Hua University, Hsinchu; Jeng D. Yang, Taipei, both of Taiwan

[73] Assignee: Wen Hsing Hsu, Hsinchu, Taiwan

[21] Appl. No.: 690,090

[22] Filed: Apr. 23, 1991

[51] Int. Cl.5 .............................................. G06K 9/00
[52] U.S. Cl. ................................................... 382/5
[58] Field of Search ................................ 382/4–5, 382/2

[56] References Cited

U.S. PATENT DOCUMENTS

| | | | |
|---|---|---|---|
| 4,083,035 | 4/1978 | Riganati et al. | 382/5 |
| 4,151,512 | 4/1979 | Riganati et al. | 382/5 |
| 4,185,270 | 1/1980 | Fischer, II et al. | 382/5 |
| 4,752,966 | 6/1988 | Schiller | 382/5 |
| 5,040,224 | 8/1991 | Hara | 382/5 |

Primary Examiner—Stephen Brinich
Attorney, Agent, or Firm—Ladas & Parry

[57] ABSTRACT

A method to automatically find out the actual position of the core point of a finger print by using the characteristic of the ridge flow of finger prints. This method comprises three parts: (1) ridge flow finding algorithm, (2) ridge flow correction algorithm and (3) core point allocation algorithm.

11 Claims, 14 Drawing Sheets

BINARY FINGER PRINT

UNCORRECTED RIDGE FLOW

CORRECTED RIDGE FLOW

FIG. 1

|   | 0 | 1 | 2 | 3 | 4 |
|---|---|---|---|---|---|
| 0 | $d_{00}$ | $d_{01}$ | $d_{02}$ | $d_{03}$ | $d_{04}$ |
| 1 | $d_{10}$ | $d_{11}$ | $d_{12}$ | $d_{13}$ | $d_{14}$ |
| 2 | $d_{20}$ | $d_{21}$ | $d_{22}$ | $d_{23}$ | $d_{24}$ |
| 3 | $d_{30}$ | $d_{31}$ | $d_{32}$ | $d_{33}$ | $d_{34}$ |
| 4 | $d_{40}$ | $d_{41}$ | $d_{42}$ | $d_{43}$ | $d_{44}$ |

FIG. 2

| $m_2$ | $m_3$ | $m_4$ |
|---|---|---|
| $m_1$ | $m_0$ | $m_5$ |
| $m_8$ | $m_7$ | $m_6$ |

FIG. 3

| DIRECTION CODE | 0 | 1 | 2 | 3 |
|---|---|---|---|---|
| RIDGE-FLOW | — <br> E-W DIRECTION | \ <br> SE-NW DIRECTION | \| <br> S-N DIRECTION | / <br> NE-SW DIRECTION |
| 3×3 PATTERN | $m_2\,m_3\,m_4$ <br> $m_1\,m_0\,m_5$ <br> $m_8\,m_7\,m_6$ | $m_2\,m_3\,m_4$ <br> $m_1\,m_0\,m_5$ <br> $m_8\,m_7\,m_6$ | $m_2\,m_3\,m_4$ <br> $m_1\,m_0\,m_5$ <br> $m_8\,m_7\,m_6$ | $m_2\,m_3\,m_4$ <br> $m_1\,m_0\,m_5$ <br> $m_8\,m_7\,m_6$ |

FIG. 4A

| 0 | 0 | 1 | 1 | 1 | 1 | 0 | 0 |
|---|---|---|---|---|---|---|---|
| 0 | 0 | 1 | 1 | 1 | 1 | 0 | 0 |
| 0 | 0 | 1 | 1 | 1 | 1 | 0 | 0 |
| 0 | 0 | 1 | 1 | 1 | 1 | 0 | 0 |
| 0 | 0 | 1 | 1 | 1 | 1 | 0 | 0 |
| 0 | 0 | 1 | 1 | 1 | 1 | 0 | 0 |
| 0 | 0 | 1 | 1 | 1 | 1 | 0 | 0 |
| 0 | 0 | 1 | 1 | 1 | 1 | 0 | 0 | n(PIXEL) × n(PIXEL)

FIG. 4B

| | | | | | | | |
|---|---|---|---|---|---|---|---|
| | 4 | 4 | 0 | 0 | -4 | -4 | |
| | 4 | 4 | 0 | 0 | -4 | -4 | |
| | 4 | 4 | 0 | 0 | -4 | -4 | |
| | 4 | 4 | 0 | 0 | -4 | -4 | |
| | 4 | 4 | 0 | 0 | -4 | -4 | |
| | 4 | 4 | 0 | 0 | -4 | -4 | |
| | | | | | | | |

| | | | | | | | |
|---|---|---|---|---|---|---|---|
| | -3 | -3 | 0 | 0 | 3 | 3 | |
| | -3 | -3 | 0 | 0 | 3 | 3 | |
| | -3 | -3 | 0 | 0 | 3 | 3 | |
| | -3 | -3 | 0 | 0 | 3 | 3 | |
| | -3 | -3 | 0 | 0 | 3 | 3 | |
| | -3 | -3 | 0 | 0 | 3 | 3 | |
| | | | | | | | |

| | | | | | | | |
|---|---|---|---|---|---|---|---|
| | 0 | 0 | 0 | 0 | 0 | 0 | |
| | 0 | 0 | 0 | 0 | 0 | 0 | |
| | 0 | 0 | 0 | 0 | 0 | 0 | |
| | 0 | 0 | 0 | 0 | 0 | 0 | |
| | 0 | 0 | 0 | 0 | 0 | 0 | |
| | 0 | 0 | 0 | 0 | 0 | 0 | |
| | | | | | | | |

| | | | | | | | |
|---|---|---|---|---|---|---|---|
| | 3 | 3 | 0 | 0 | -3 | -3 | |
| | 3 | 3 | 0 | 0 | -3 | -3 | |
| | 3 | 3 | 0 | 0 | -3 | -3 | |
| | 3 | 3 | 0 | 0 | -3 | -3 | |
| | 3 | 3 | 0 | 0 | -3 | -3 | |
| | 3 | 3 | 0 | 0 | -3 | -3 | |
| | | | | | | | |

$C_3$

BINARY FINGER PRINT
FIG. 5A

UNCORRECTED RIDGE FLOW
FIG. 5B

CORRECTED RIDGE FLOW
FIG. 5C

METHOD AND DEVICE FOR ALLOCATING CORE POINTS OF FINGER PRINTS

FIELD OF THE INVENTION

The present invention relates generally to a method to be used in a computerized finger print processing system to allocate the core points of finger prints and in particular to a method for matching finger prints.

BACKGROUND OF THE INVENTION

Using a computer to do finger print processing is very efficient and convenient in matching finger prints as the computer has a great capacity to do a number of operations in a very short period. Owing to the rapid speed of processing in the studying of finger prints by means of the computer, the characteristics used to identify a finger print are much simpler than ever and, therefore, it is possible to process a great number of finger prints at the same time. Nevertheless, different images of the same finger print usually cannot be identified as the same. The magnitude and orientation of the force applied by a finger tip in producing the finger print thereof and the translation and rotation of the finger will more or less affect the configuration of the printed finger print.

The finger prints of human beings are categorized into 8 groupings according to the ridges of finger prints. The ridge flows of some groupings are quite different from each other and a common characteristic is almost impossible to obtain. It is the major task for researchers to develop a finger print recognition system which is capable of recognizing all kinds of finger prints in spite of the great difference in the ridge flows.

SUMMARY OF THE PRESENT INVENTION

It is therefore an object of the present invention to provide a method which is capable of allocating the core point of a finger print, no matter what grouping the finger print belongs to.

It is another object of the present invention to provide a method which is capable of allocating the core point of a finger print, no matter how badly the finger print is distorted.

It is a further object of the present invention to provide a method which is capable of allocating the core point of a finger print, no matter how many times the same finger print is repeatedly and differently input.

The present invention analyzes the ridge flow of a finger print according to the characteristics of its ridge flow and locates the core point thereof to the analysis of the ridge flow. No matter how the finger print is rotated, translated and/or scaled the core point can be allocated at the same point every time the same finger print is input. The core point of a finger print can always be located, no matter what grouping of finger print it belongs.

BRIEF DESCRIPTION OF THE DRAWINGS

In the drawings:

FIGS. 7a–7i show the core points of the same finger prints with different inputs obtained with the method in accordance with the invention.

DETAILED DESCRIPTION OF THE PREFERRED EMBODIMENT

The method in accordance with the present invention comprises at least the following three steps:

(1) the step to find out the ridge flow of a finger print;
(2) the step to correct the ridge flow; and
(3) the step to allocate the core point of the finger print via the corrected ridge flow.

All these steps will be described hereinafter.

Finding Out the Ridge Flow

The original image of a finger print is usually a gray level image, and a binary image can be obtained therefrom when the image is processed to be represented by binary codes. The present invention makes use of the binary image to do finger print processing. In the present invention, the orientations of the ridge flow of a finger print are categorized into four groupings, each represented by an individual direction code. In the direction codes, "0" represents the orientation of east-west, "1" the orientation of southeast-northwest, "2" the orientation of north-south and "3" the orientation of northeast-southwest.

For a binary image constituted by a k (pixel)×k (pixel) matrix, where k=m×n, the binary image is first divided into m×x m windows, each of which is an n (pixel)×n (pixel) sub-matrix. The values of m and/or n should be adjusted in accordance with the ratio that a finger print is taken in the whole image. To specifically describe the step, k is taken, for example, as 256 and m is 32 and n is 8. In applying the method, each window is processed individually. That is, each of the n×n sub-matrix is individually processed to determine the direction thereof.

Figure 1:
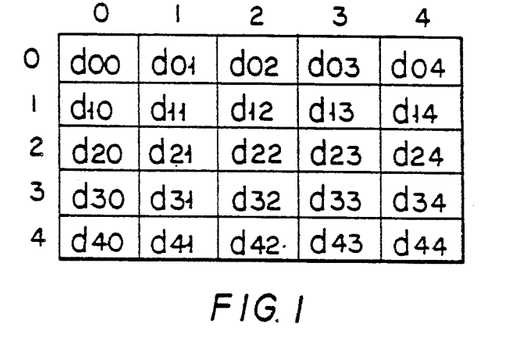
FIG. 1 a diagram showing the image elements to be processed when a binary image is operated by the method in accordance with the invention to find the ridge flow thereof.
Figure 2:
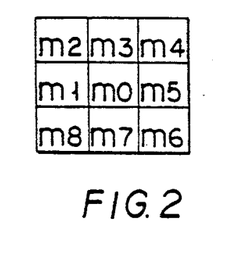
FIG. 2 a mask used by the method to do convolution operations in accordance with the invention.

The direction code of each n×n sub-matrix is obtained with a convolution operation. For a given two-dimensional data matrix (such as that shown in FIG. 1) and a 3×3 mask (such as that shown in FIG. 2), the convolution operation taken upon the (1, 1) element of the data matrix of FIG. 1 with the 3×3 mask of FIG. 2 gives the result.

$$C = (m_1 \times d_{10}) + (m_2 \times d_{00}) + (m_3 \times d_{01}) + (m_4 \times d_{02}) + (m_5 \times d_{12}) + (m_6 \times d_{22}) + (m_7 \times d_{21}) + (m_8 \times d_{20})$$

That is, to place the centered element of the c×3 mask at the (1, 1) location of each of the data matrix and then summing up the products of the eight elements of the 3×3 mask that are around the centered element thereof times its associated element of the data matrix. The convolution operation is taken upon all elements of the data matrix, except those elements located at the four edges of the data matrix.

Figure 3:
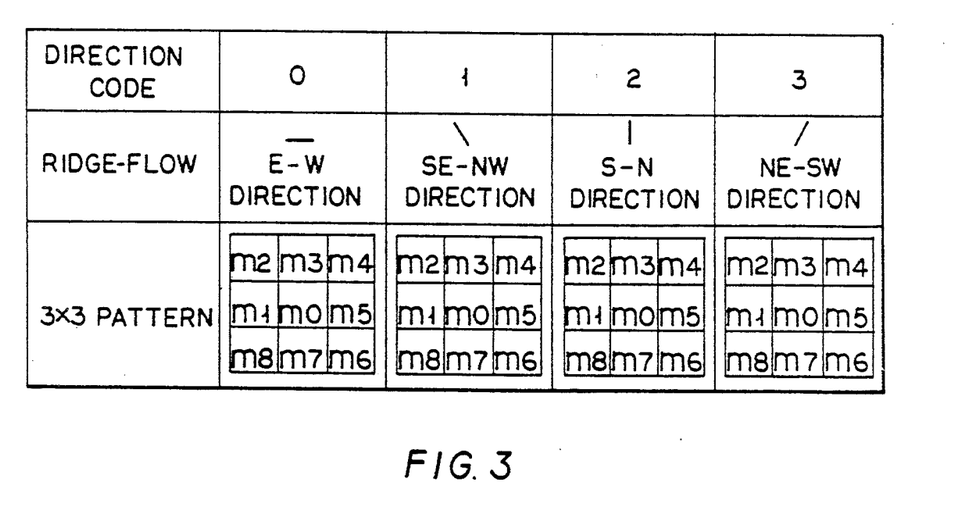
FIG. 3 the numeric values of the masks for four kinds of ridge flow.
Figure 4A:
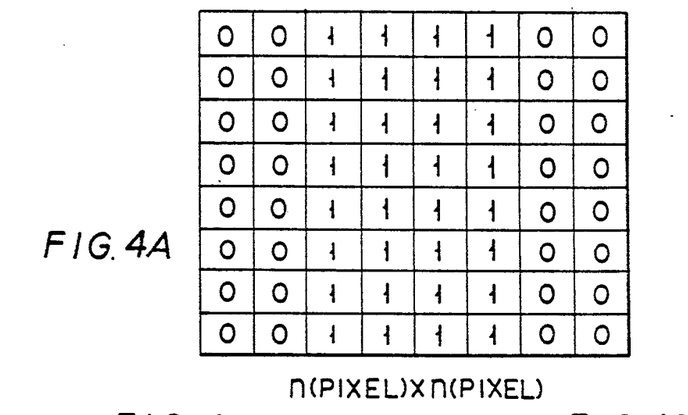
FIGS. 4a–4e show the window to be processed (part a) and the results (part $c_0$, $c_1$, $c_2$ and $c_3$) of the convolution operations thereof with the masks shown in FIG. 3.
Figure 4B:
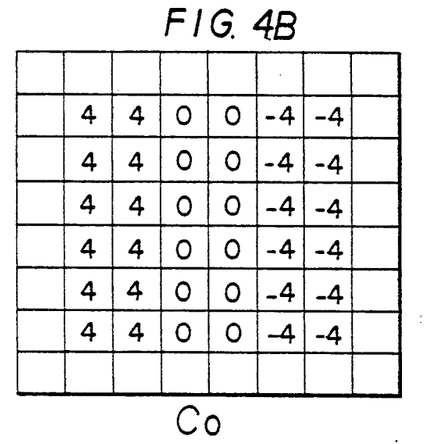
Figure 4C:
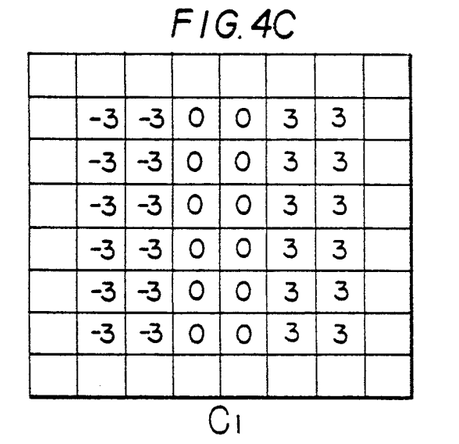
Figure 4D:
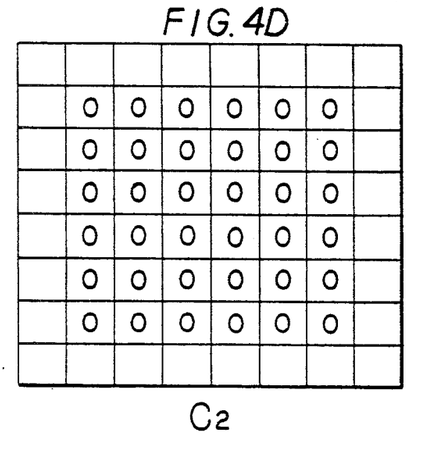
Figure 4E:
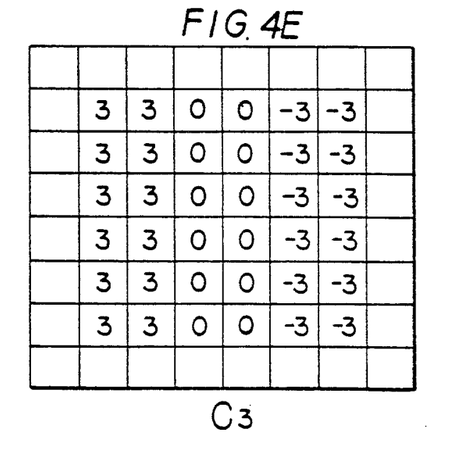
Figure 5A:
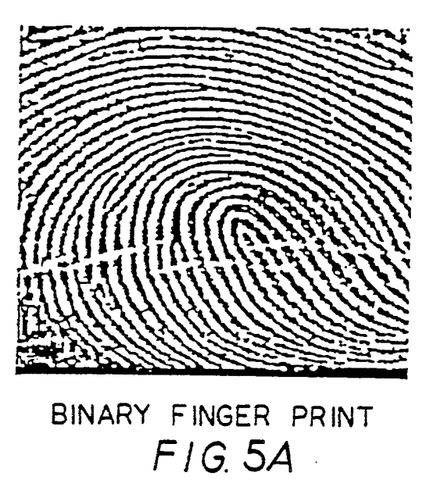
FIGS. 5a–5i show binary finger prints ($a_1$, $a_2$ and $a_3$), the ridge flows thereof ($b_1$, $b_2$ and $b_3$) and the corrected ridge flows ($c_1$, $c_2$ and $c_3$)
Figure 5B:
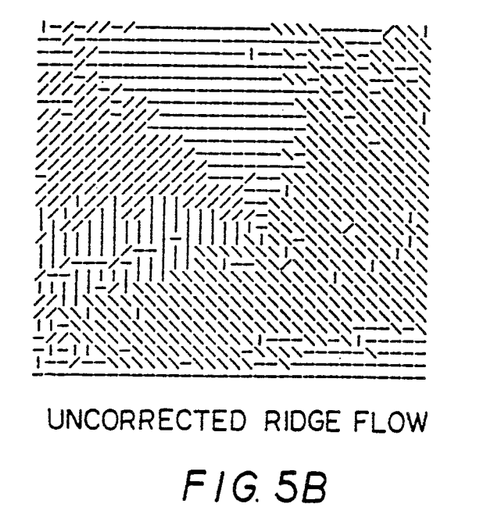
Figure 5C:
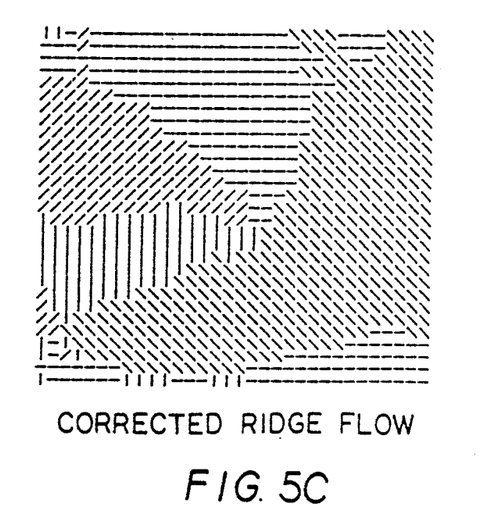
Figure 5D:
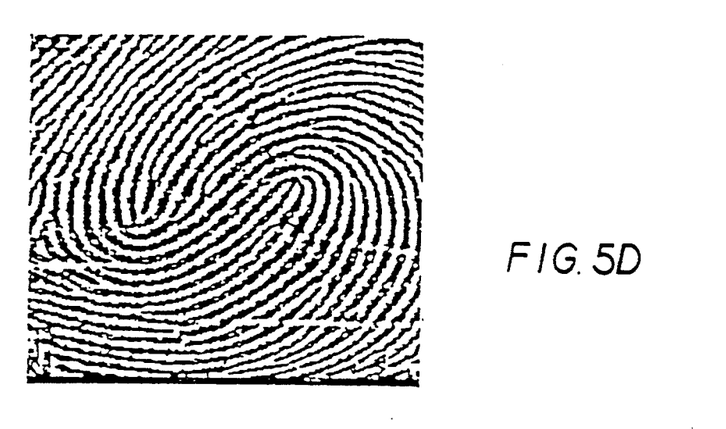
Figure 5E:
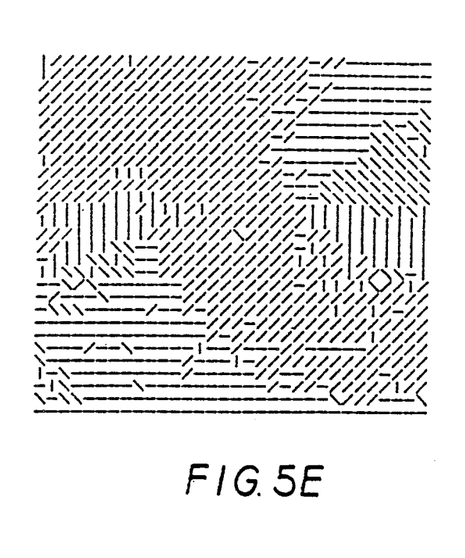
Figure 5F:
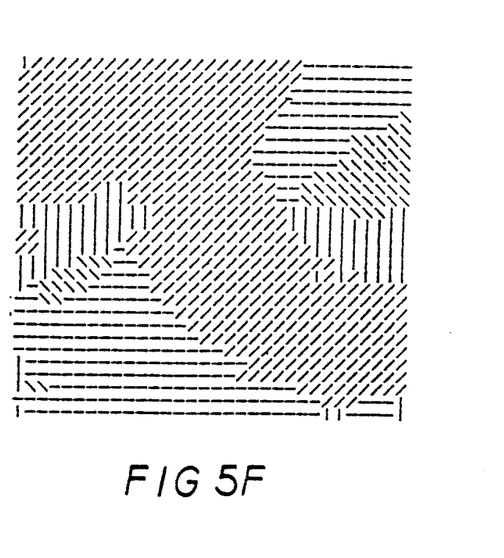
Figure 5G:
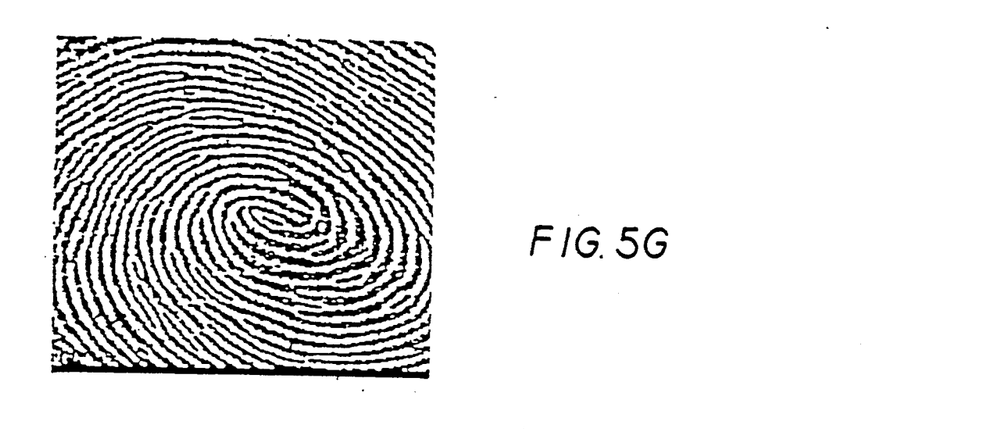
Figure 5H:
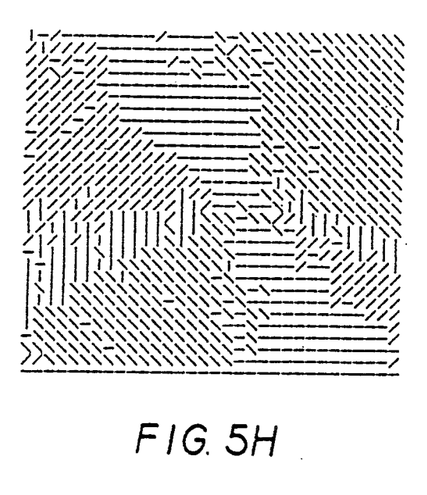
Figure 5I:
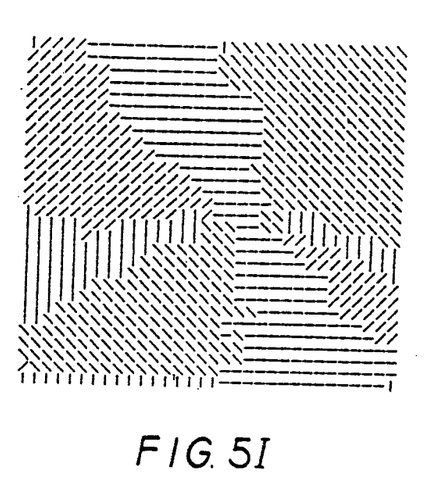
Figure 6A:
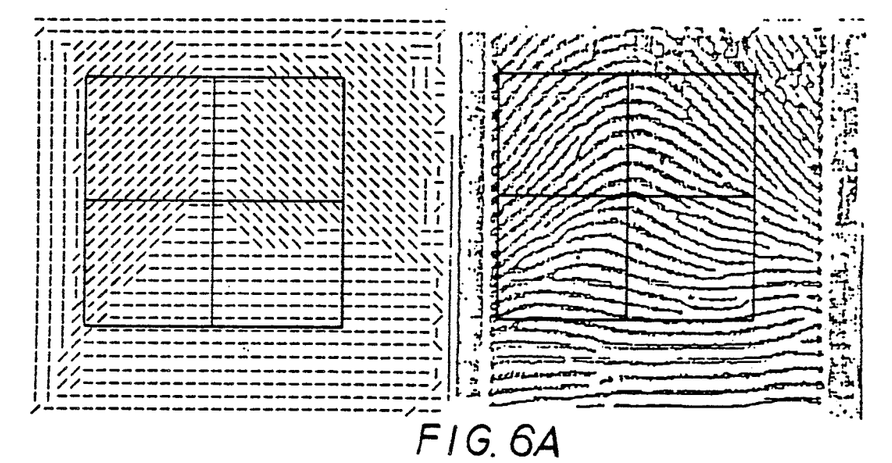
FIGS. 6a–6h show a representative finger print for each of the eight groupings and the core point thereof obtained with the method in accordance with the invention.
Figure 6B:
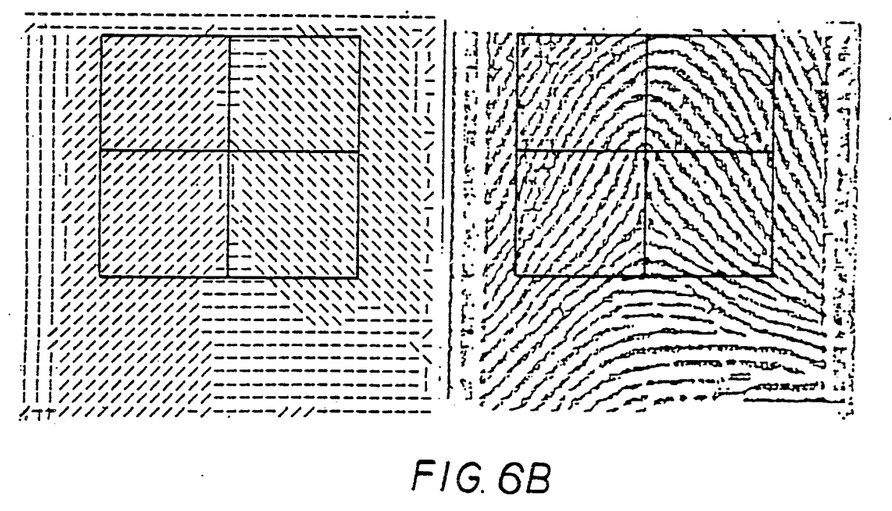
Figure 6C:
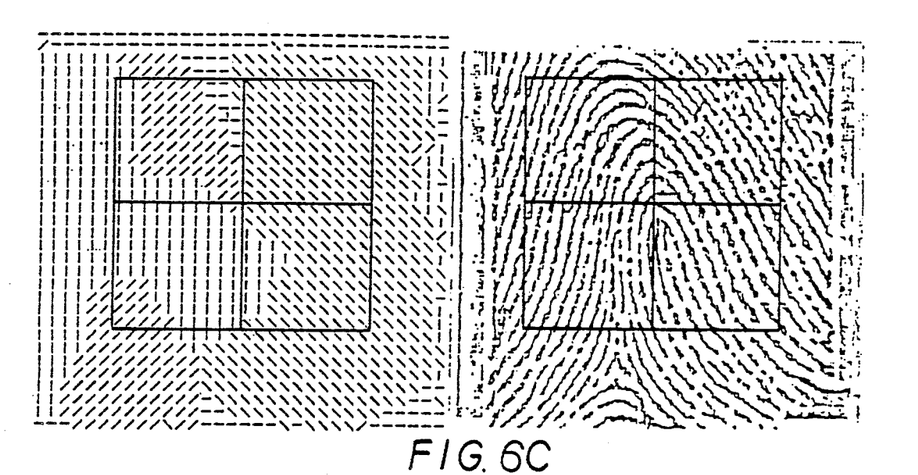
Figure 6D:
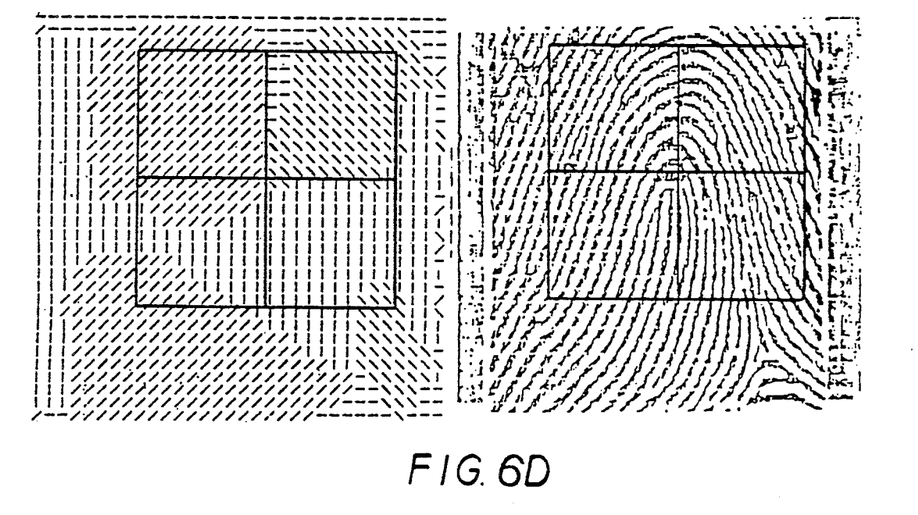
Figure 6E:
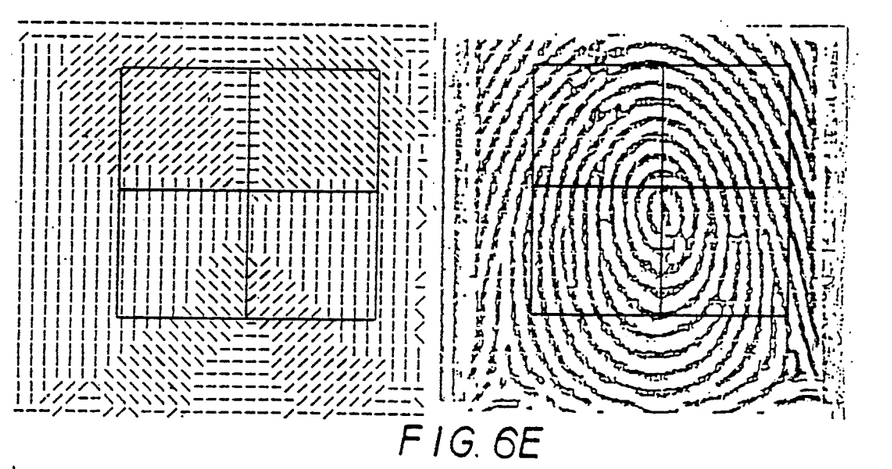
Figure 6F:
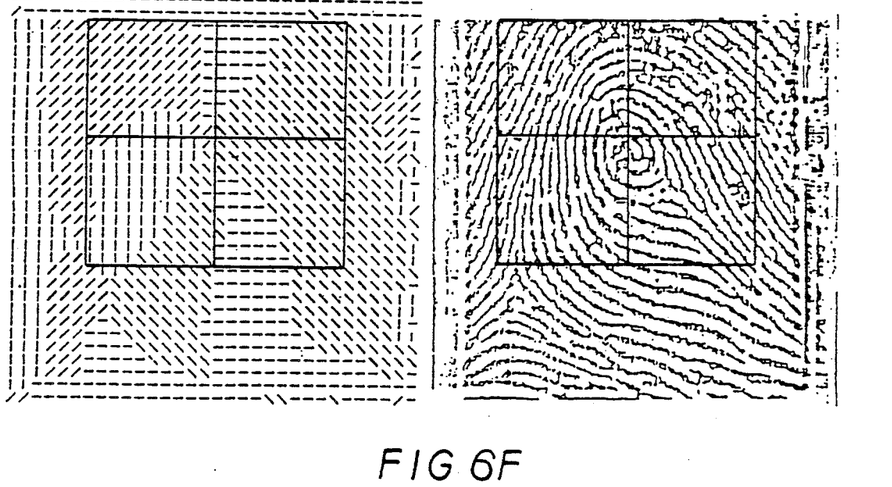
Figure 6G:
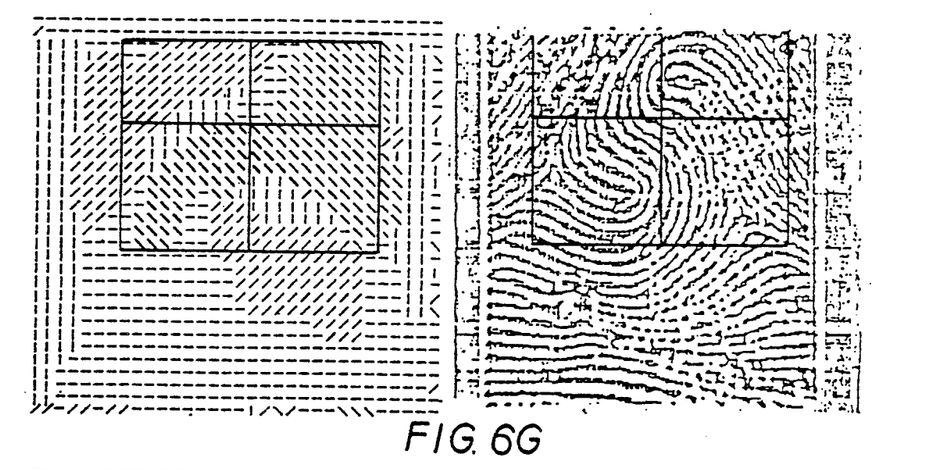
Figure 6H:
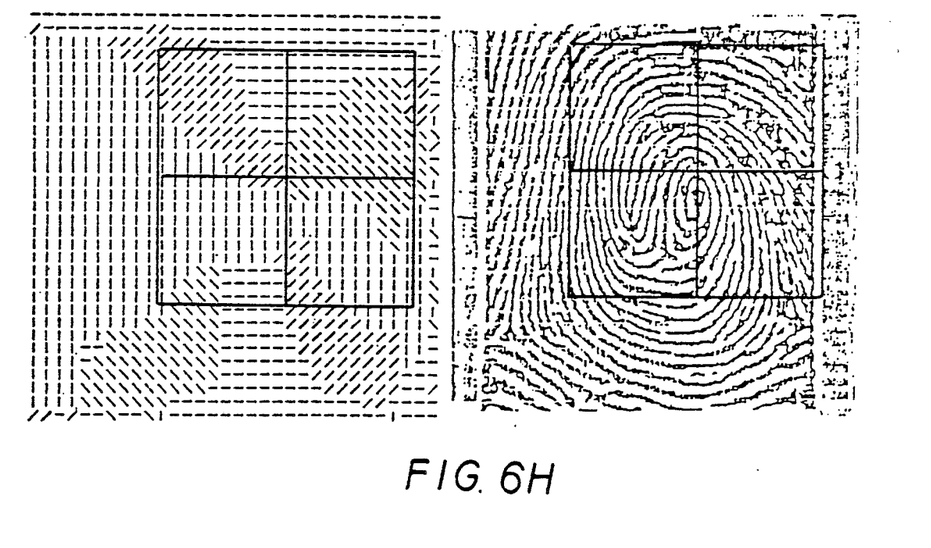
Figure 7A:
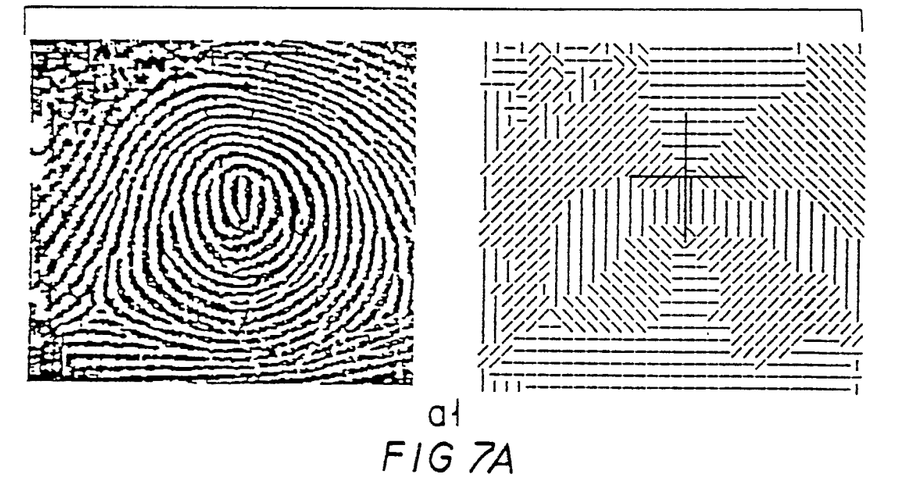
Figure 7B:
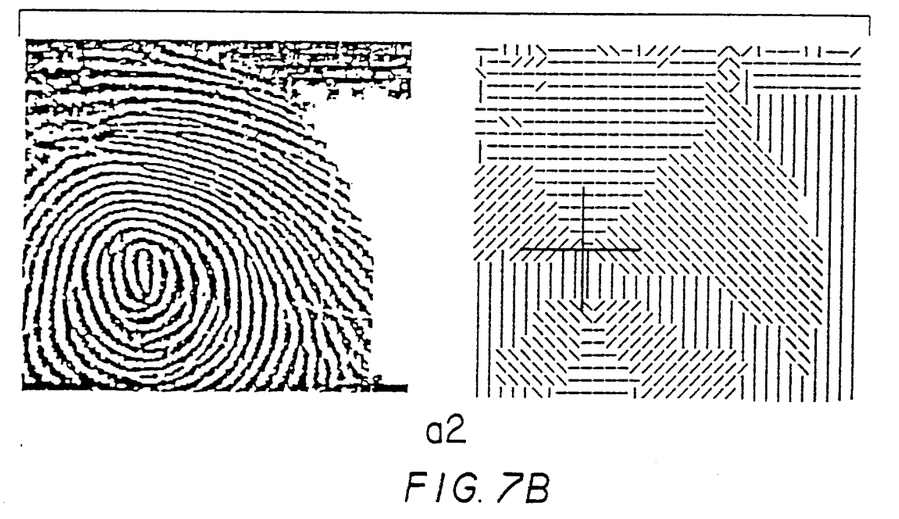
Figure 7C:
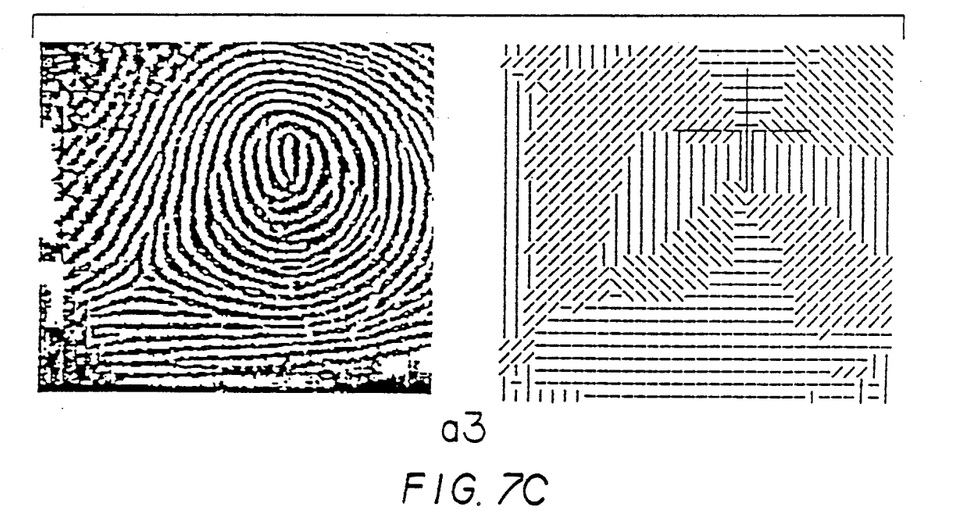
Figure 7D:
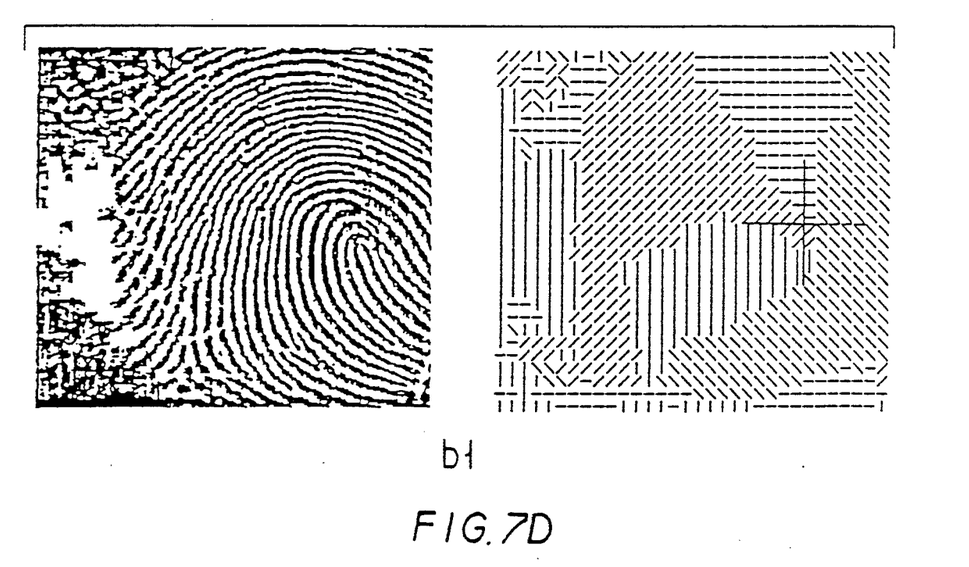
Figure 7E:
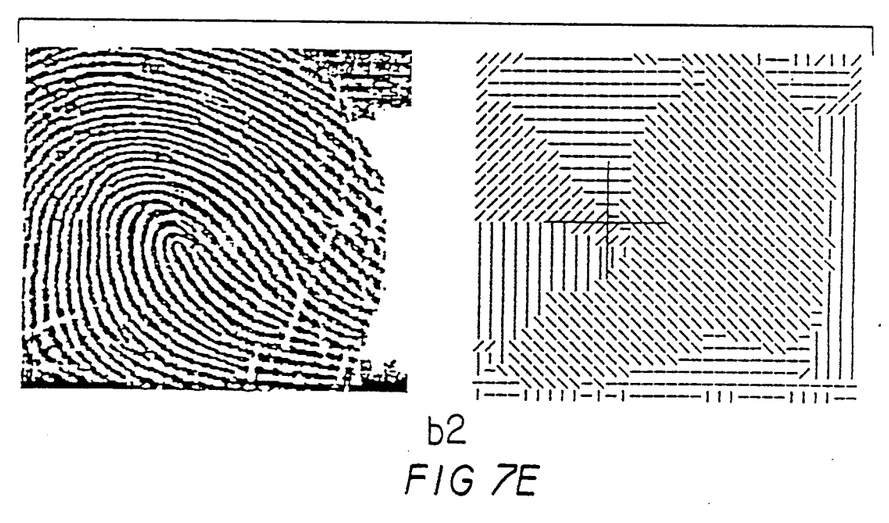
Figure 7F:
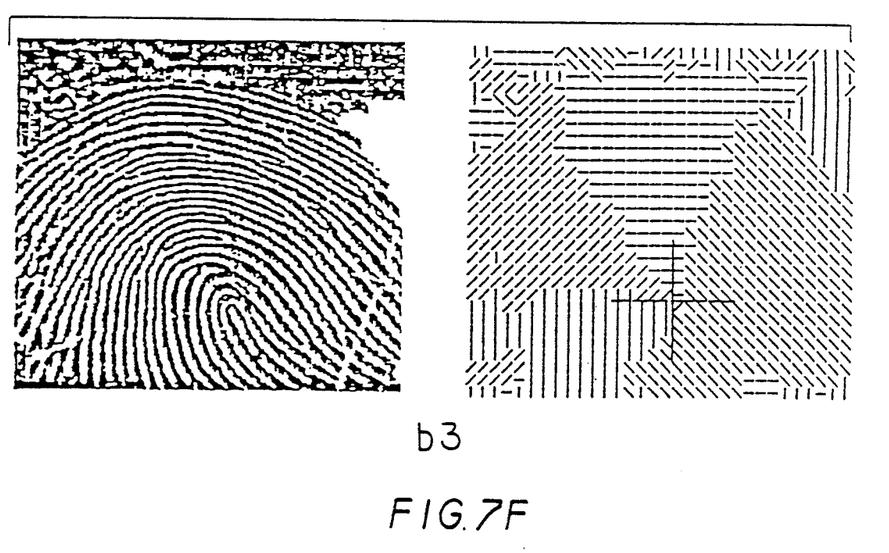
Figure 7G:
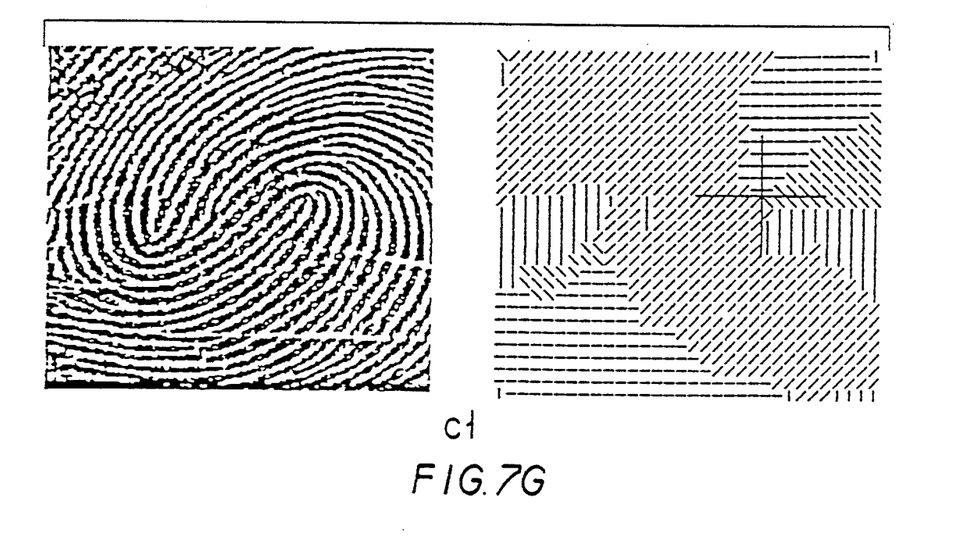
Figure 7H:
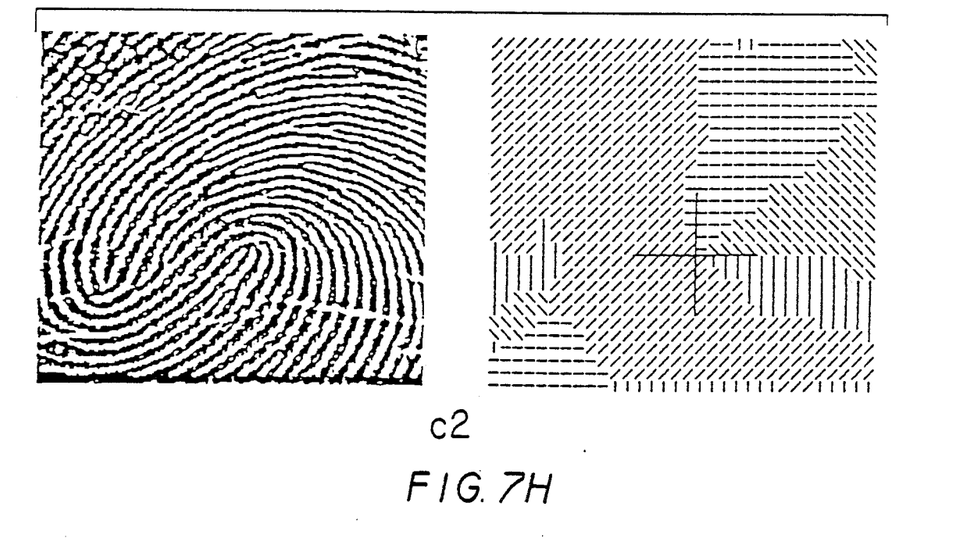

For determining the direction code of an n×n sub-matrix (n=8, as stated previously), the convolution operation is taken upon the inner element of the sub-matrix with the four masks shown on FIG. 3, and the results of the convolution operation with the four masks are denoted by $c_0$, $c_1$, $c_2$ and $c_3$ (An inner element of a sub-matrix is an element that is not located at any edge row or edge column of the sub-matrix.)

Taking the matrix denoted by (a) in FIG. 4 as an example of an n×n sub-matrix of a finger print binary image to be processed. In the area of the finger print covered by the sub-matrix, the orientation of the ridge flow is north-south, therefore the centered four columns have the value "1" and the other columns are "0" (Recall that this is a binary image.) The results of the convolution operation with the four masks are also show in FIG. 4 and are respectively denoted by $c_0$, $c_1$, $c_2$ and $c_3$, as stated previously.

The rule to determine the direction code from the convoluted results $c_0$, $c_1$, $c_2$ and $c_3$ is that the direction code thereof is the one associated with the convoluted result which has the most "0" among all other convoluted results. That is the convoluted result that has the largest number of "0" among all other convoluted results determines the direction code. The orientation of the ridge flow inside the area covered by the sub-matrix is determined from the direction code. It is clear from FIG. 4 that $c_2$ has the most "0" and that the direction code is "2". This is to say that the orientation is north-south which is exactly what is given.

FIG. 5 shows several finger prints and the results obtained with the above procedure, wherein $a_1$ to $a_3$ are binary images of the finger prints, and $b_1$ to $b_3$ are the distribution map of codes that display the orientation patterns of the ridge flows obtained with the above-mentioned convolution operation. As stated previously, each binary image is constituted by a 256×256 data matrix and is divided into 32×32 windows, each of which comprises 8×8 image elements.

Correcting the Ridge Flow

When the quality of the original copy of a finger print is bad, for example the print may contain many local distortions of the ridge pattern, the binary image thus has many noises (incorrect data due to the local distortions). This results in incorrect results in determining the orientation with the above method. Since the ridge flow changes smoothly and the orientations thereof in adjacent areas are the same, it is possible to correct the ridge flow and eliminate the incorrect results. This will be described hereinafter.

Taking a 3×3 matrix which is constituted by an adjacent direction code taken from the resulting matrix of the convolution operation as follows:

$$q_{i-1,j-1'} \quad q_{i-1,j} \quad q_{i-1,j+1}$$
$$q_{i,j-1'} \quad q_{i,j} \quad q_{i,j+1}$$
$$q_{i+1,j-1'} \quad q_{i+1,j} \quad q_{i+1,j+1}$$

where i and j are numbers between o and m (m=32 here) and represent the location of a direction code in the matrix constituted by the m×m windows, q represents the corrected direction code and p is the direction code which has not been corrected yet. If among the nine codes, "d" is the direction code that appears the most times, then the direction code $p_{ij}$ should be substituted by "a", if it is not "d".

In FIG. 5, $c_1$ to $c_3$ are the corrected orientation patterns obtained from the un-corrected distribution map of codes $b_1$ to $b_3$ with the rule stated above. It is clear that although there are noises input into the processing system, a correct ridge flow can also be obtained.

Allocating the Core Point

By analyzing a great number of finger prints after having been processed with the above two procedures, it is found that there is always an inverted east-west-ward triangle formed on the upper part of the ridge flow. It is concluded that the core point is located at the lower vertex or narrowest part therearound.

With a way to determine the core point, each time a finger print is analyzed, the core point can be obtained first as a reference in matching finger prints and thus making the matching more correct.

EXAMPLE 1

In FIGS. 6, (a) to (h) show a typical sample of the 8 groupings of finger print and the core points thereof identified with the method in accordance with the invention. It is seen from FIG. 6 that no matter which grouping a finger print belongs to, an inverted triangle as stated previously always exists and it is always possible to identify the core point thereof with the method of the present invention, without any exception.

EXAMPLE 2

In FIG. 7, the finger prints of three fingers, each of which is input three times, together with the core points thereof are shown. In the figure, ($a_1$, $a_2$, $a_3$) represent the three inputs of the first finger print ($b_1$, $b_2$, $b_3$) represent those of the second finger print and ($c_1$, $c_2$, $c_3$) represent those of the third finger print. It is clear that although the finger prints may be translated and/or distorted and thus have differences from each other, the same core point for the same finger print is always identified and located with the present method.

As described, the present invention provides a method which is capable of identifying and allocating the core point of a finger print, no matter how many times the finger print is input. Even though a finger print is translated and/or distorted, the core point thereof can always be identified with the method of the present invention.

A method for allocating the core points of finger prints is described above and various details of the invention may be changed without departing from its scope. The foregoing description is for the purpose of illustration only and not for limitation —the invention being defined by the appended claims.

What is claimed is:

1. A method for allocating a core point of a finger print in the form of a binary image constituted by a plurality of windows, comprising the following steps:
    (1) finding out ridge flows of said finger print—assigning a direction code to each of said windows of the binary image;
    (2) correcting the ridge flows —correcting the direction codes in order to eliminate noises; and
    (3) allocating the core point —allocating the core point in accordance with the corrected direction codes.

2. A method as claimed in claim 1 wherein the step of finding out the ridge flows comprises the following steps:
   (1) window division —dividing the binary image into a number of windows, each constituted by a plurality of image elements of "0" or "1" and covering a part of said binary image;
   (2) calculation —making operations on said image elements of each of said windows to give a result;
   (3) decision —dividing the orientation for each part of said image covered by one of said windows in accordance with said result; and
   (4) coding—giving each part of said image a direction code in accordance of the orientation thereof.

3. A method as claimed in claim 2, wherein the step of calculation comprises a step of taking a convolution operation on a part of a window comprising nine elements denoted $d_{00}$, $d_{01}$, $d_{02}$, $d_{10}$, $d_{11}$, $d_{12}$, $d_{20}$, $d_{21}$, and $d_{22}$ respectively and arranged as

| $d_{00}$ | $d_{01}$ | $d_{02}$ |
| --- | --- | --- |
| $d_{10}$ | $d_{11}$ | $d_{12}$ |
| $d_{20}$ | $d_{21}$ | $d_{22}$ | with a 3×3 mask arranged as

| $m_2$ | $m_3$ | $m_4$ |
| --- | --- | --- |
| $m_1$ | $m_0$ | $m_5$ |
| $m_8$ | $m_7$ | $m_6$ | a result of said convolution operation being obtained by placing the centered element $m_0$ on the element $d_{11}$ and summing up the products of each element of said mask times the associated element of said part of a window, except the centered element $m_o$, namely, $$C=(m_1 \cdot d_{10})+(m_2 \cdot d_{00})+(m_3 \cdot d_{01})+(m_4 \cdot d_{02})+(m_5 \cdot d_{12})+(m_6 \cdot d_{22})+(m_7 \cdot d_{21})+(m_8 \cdot d_{20}).$$

4. A method as claimed in claim 3 wherein said mask is one of the following:

| −1 | 0 | 1 | 2 | 1 | 0 | −1 | −2 | −1 | 0 | −1 | −2 |
| --- | --- | --- | --- | --- | --- | --- | --- | --- | --- | --- | --- |
| −2 | 0 | 2 | 1 | 0 | −1 | 0 | 0 | 0 | 1 | 0 | −1 |
| −1 | 0 | 1, | 0 | −1 | −2, | 1 | 2 | 1, or | 2 | 1 | 1 | each of which is associated with a particular orientation.

5. A method as claimed in claim 2, wherein the step of calculation is to take a convolution operation on each of said windows with four 3×3 masks and the step of decision gives the orientation of said each of the windows in accordance with the number of "0",s which are results of the convolution operation.

6. A method as claimed in claim 1, wherein the step of correcting the ridge flow comprises the following steps:
   (1) checking —checking, for each one of said windows, the direction codes of the eight windows therearound and taking the code, of which the number is the largest, as a reference code; and
   (2) correcting —substituting the direction code of said window with the reference code if said direction code is different from the reference code.

7. A method as claimed in claim 1, wherein the step of allocating the core point comprises the following steps:
   (1) searching —searching among the direction codes of said image for a particular area constituted by a selected code and substantially located at the upper part of said image; and
   (2) allocating —picking up the narrowest portion of said particular area as the core point.

8. A method as claimed in claim 7, wherein said selected code is the code represents the horizontal extension of the ridge flow.

9. A finger print processing apparatus comprising:
   (1) input means which inputs a binary image for processing;
   (2) coding means which divides said binary image into a plurality of windows and gives each of the windows a direction code according to a ridge flow thereof to form a distributions map of the direction codes of the windows;
   (3) allocating means which finds out a particular upper area of a selected code in said distribution map according to the direction codes and locates the narrowest portion of said upper area as the core point; and
   (4) processing means which takes operations on said binary image, taking the core point thereof as a reference point;
characterized in that the coding means gives four types of direction codes for the orientations of east-west, southeast-northwest, south-north and northeast-southwest.

10. The apparatus as claimed in claim 9, further comprising correcting means which corrects the direction code of each of the windows with the number of the direction codes of the eight window disposed therearound so as to eliminate the noises.

11. The apparatus as claimed in claim 9 wherein said selected code is the code of the orientation east-west.

* * * * *